P. BIMELER AND E. T. DIERINGER.
WIND SHIELD CLEANING DEVICE.
APPLICATION FILED OCT. 23, 1918.
1,313,576.
Patented Aug. 19, 1919.
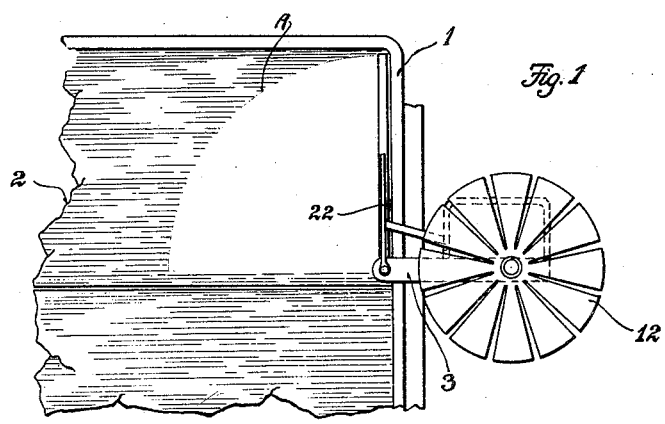
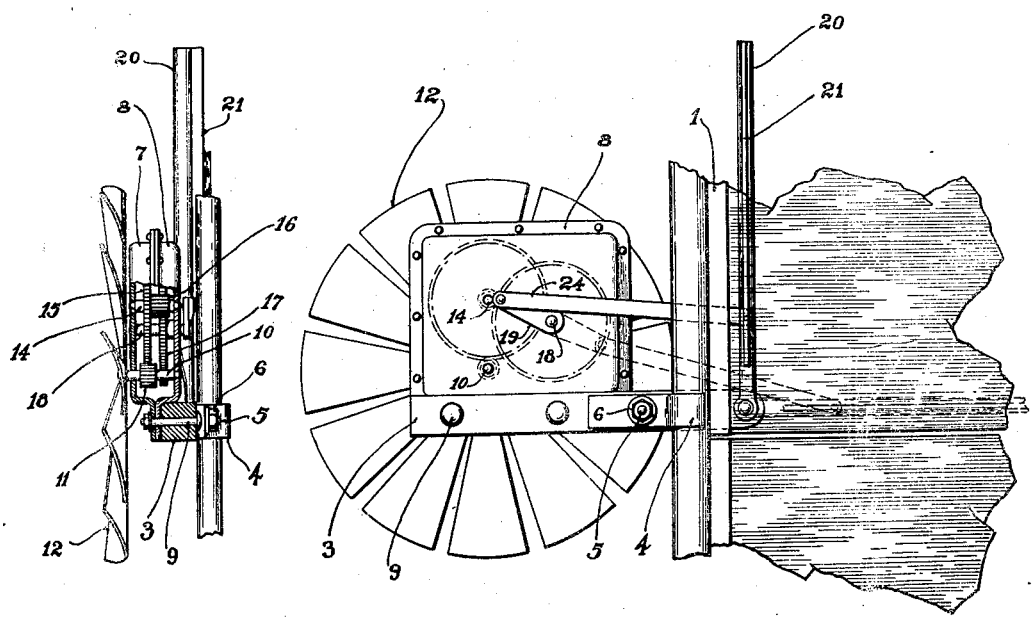
INVENTORS
Peter Bimeler and
Ernst T. Dieringer.
By Friese, Merkel, Saywell & Bond
ATTORNEYS.

UNITED STATES PATENT OFFICE.

PETER BIMELER, OF ZOAR, AND ERNST T. DIERINGER, OF BOLIVAR, OHIO.

WIND-SHIELD-CLEANING DEVICE.

1,313,576.  Specification of Letters Patent.  Patented Aug. 19, 1919.

Application filed October 23, 1918. Serial No. 259,386.

*To all whom it may concern:*

Be it known that we, PETER BIMELER, a citizen of the United States, residing at Zoar, in the county of Tuscarawas and the State of Ohio, and ERNST T. DIERINGER, a citizen of the United States, residing at Bolivar, in the county of Tuscarawas and State of Ohio, have invented a new and useful Wind-Shield-Cleaning Device, of which the following is a specification.

This invention relates to wind shield cleaning devices designed to be used upon the glass wind shields of motor vehicles, electric tram cars, railroad locomotives or the like, the object being to construct such a device, the purpose of which is to remove rain, snow, etc., from the wind shield of the vehicle so that the operator of the said vehicle may have a clear view.

Another object is to construct a device of this class that will be constant in its operation while the vehicle is moving and therefore continuously wipe the point of vision upon the wind shield, clear.

Another object is to construct such a device designed to be operated by the wind, a fan wheel being provided for furnishing the power to the cleaner arm mechanism.

Another object is to construct a device of this character that may be quickly and easily attached to the supports of an automobile wind shield, the casing of a locomotive cab window, the window to the motorman's vestibule upon an electric tram car or any similar vehicle operator's vision glass.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

Similar numerals of reference indicate corresponding parts throughout the several figures of the drawings, in which—

Figure 1 is a front elevation of a portion of an automobile wind shield showing our improved wind shield cleaning device in position thereon.

Fig. 2 is an end elevation partly in section of our device on a somewhat larger scale, than Fig. 1.

Fig. 3 is a rear elevation of the device on the same scale as Fig. 2.

At 1 is shown the frame of an automobile wind shield with the usual glass 2 positioned therein. A support arm 3 is positioned against the outer side of the wind shield standard and a clamp member 4 is employed to secure the said support arm in place, a bolt 5 passing through the said clamp member and support arm and having a nut 6 threaded upon its extremity, serving to clamp the member 4 against the wind shield standard.

A hollow housing formed of a pair of similar casing members 7 and 8 is secured to the support member 3 by means of bolts 9 or the like. The members 7 and 8 are preferably formed of stamped sheet metal and are rectangular as shown in Fig. 3 and have flanges extending entirely around their outer edges, the said flanges being placed face to face as shown in Fig. 2 and secured together by rivets, screws or the like.

A shaft 10 is journaled within the members 7 and 8 and fixed to the said shaft and within the casing, is a pinion 11. One extremity of the shaft 10 projects through the wall forward by the member 7 and to the outer end of the said shaft is secured a fan wheel 12. A second shaft 14 is journaled within the members 7 and 8 and fixed to the shaft 14 is a pinion 15 of relatively great size as compared to the pinion 11 and arranged to mesh with the said pinion 11. The shaft 14 also has a relatively small pinion 16 fixed to it, the pinion 16 meshing with a second relatively large pinion 17, fixed to a third shaft 18, mounted within the members 7 and 8. It will thus be obvious that the rotation of the fan wheel 12, will, through the intermeshing pinions within the casing, impart the said rotation to the shaft 18, the rotations of the shaft 18 however being considerably slower than the rotation of the shaft 10 by reason of the reduction effected by meshing the small driving pinions with the large driven pinions. The inner extremity of the shaft 18 projects through the wall of the member 8 and to the free extremity of the said shaft is secured a crank arm 19. As shown in Figs. 1 and 3, the inner end of the support arm 3 extends to a point beyond the wind shield standard and to the inner end of the said support arm is pivoted an arm 20 to the inner face of which is secured a strip of rubber or similar material as shown at 21, which strip is designed to bear against the outer surface of the glass of the wind shield. A spring 22 pivoted in alinement with the pivot of the arm 20, is arranged to exert a continuous pressure upon the outer side of the arm 20 to thus insure the strip 21 being held in contact with the surface of the glass. A connecting link 24 is pivotally secured at one end to the crank arm 19 and at its opposite end to the arm 20, thus causing the said arm 20 to swing up and down and describe the arc of a circle as the fan wheel 12 rotates and turns the crank arm. The path of travel of the arm 20 is indicated at A in Fig. 1, thus continuously wiping the wind shield clean in the area across which it moves.

While we have shown and described our device as applied to the wind shield of an automobile it will be obvious that it can be as readily attached to the window casing in a locomotive cab through the window of which an engineer must observe the track ahead, or it may be readily attached to the window casing of an electric car vestibule through which window the motorman must observe the track. By reason of the great reduction in the gearing, a very slight breeze will serve to rotate the fan wheel thus, as the vehicle moves forward the air current thrown against the said fan wheel will cause it to rotate rapidly, producing a continuous oscillation of the arm 20 and thereby effectively removing the rain, snow or the like from the vision glass.

Having now described our invention what we claim, is—

1. In a wind shield cleaner of the class described, a wiping arm designed to contact with the outer surface of the glass of said wind shield and an air operated fan wheel operatively connected to said wiping arm and designed to move said wiping arm over the surface of said wind shield.

2. A wind shield cleaner comprising an arm designed to wipe over the surface of a wind shield glass and wind operated means for actuating said arm.

3. A wind shield cleaner comprising a pivoted wiping arm designed to be placed in contact with the wind shield glass and wind operated means for oscillating the said arm upon its pivot to wipe over the surface of the glass.

4. A wind shield cleaner comprising a pivoted wiping arm arranged to lie against the outer surface of a wind shield glass, a wind driven fan operatively connected to said wiping arm and designed to oscillate said arm upon its pivot as the fan operates.

5. A wind shield cleaner comprising a pivoted arm designed to be secured adjacent a wind shield glass, a spring arranged to force said arm into contact with the said glass, a wind driven fan wheel, and a crank arm operatively connected to said fan wheel and designed to be rotated as said fan rotates and a connecting link pivotally connected at one end to the said wiping arm and at its other end to the said crank arm.

6. A wind shield cleaner comprising a casing, a shaft journaled within said casing and extending therefrom, a fan wheel mounted upon said shaft and outside of said casing, a second shaft journaled within said casing and extending therefrom, a crank arm secured to said second shaft and outside of said casing, a train of reduction gears operatively connecting said first shaft to said second shaft, a pivoted wiping arm adapted to lie against the glass of a wind shield and a connecting link connected at one end to the said wiping arm and at the opposite end to the said crank arm.

In testimony that we claim the above we have hereunto subscribed our names.

PETER BIMELER.
ERNST T. DIERINGER.